(12) United States Patent
Ukita et al.

(10) Patent No.: US 6,933,926 B2
(45) Date of Patent: Aug. 23, 2005

(54) MOBILE DEVICE AND KEY ARRANGING METHOD

(75) Inventors: Yoshitaka Ukita, Tokyo (JP); Masao Ozawa, Ibaraki (JP)

(73) Assignee: Sony Corporation, Tokyo (JP)

( * ) Notice: Subject to any disclaimer, the term of this patent is extended or adjusted under 35 U.S.C. 154(b) by 396 days.

(21) Appl. No.: 09/872,746

(22) Filed: Jun. 1, 2001

(65) Prior Publication Data

US 2001/0048428 A1 Dec. 6, 2001

(30) Foreign Application Priority Data

Jun. 5, 2000 (JP) .................................... P2000-171997
May 7, 2001 (JP) .................................... P2001-135930
May 10, 2001 (JP) .................................... P2001-139495

(51) Int. Cl.[7] .............................................. G09G 5/00
(52) U.S. Cl. ...................... 345/168; 345/172; 341/22; 400/472; D14/392
(58) Field of Search ............................... 345/168, 172, 345/161; 341/22–23, 27; 400/472, 486–489; D14/392–393

(56) References Cited

U.S. PATENT DOCUMENTS

| | | | |
|---|---|---|---|
| 5,375,226 A | | 12/1994 | Sano et al. ................ 395/500 |
| 5,434,964 A | | 7/1995 | Moss et al. ................ 395/157 |
| 5,626,428 A | * | 5/1997 | Miwa ........................ 400/486 |
| 5,675,362 A | | 10/1997 | Clough et al. ............. 345/173 |
| 5,700,097 A | | 12/1997 | Kuhlenschmidt ......... 400/487 |
| 5,708,561 A | | 1/1998 | Huilgol et al. ............ 361/681 |
| 5,785,439 A | * | 7/1998 | Bowen ...................... 400/472 |
| 5,914,707 A | * | 6/1999 | Kono ......................... 345/168 |
| 5,995,024 A | * | 11/1999 | Kambayashi et al. ........ 341/22 |
| 6,046,732 A | * | 4/2000 | Nishimoto ................. 345/168 |
| 6,178,338 B1 | * | 1/2001 | Yamagishi et al. ........ 455/566 |
| 6,198,474 B1 | * | 3/2001 | Roylance ..................... 341/22 |

FOREIGN PATENT DOCUMENTS

| | | | |
|---|---|---|---|
| DE | 4221801 | 1/1994 | ............ G05G/1/02 |
| EP | 0605949 | 7/1994 | ............ G06F/3/023 |
| WO | WO 9819227 | 5/1998 | ............ G06F/3/02 |

* cited by examiner

*Primary Examiner*—Alexander Eisen
*Assistant Examiner*—Kimnhung Nguyen
(74) *Attorney, Agent, or Firm*—Jay H. Maioli

(57) ABSTRACT

A mobile device includes a vertically-oriented handheld housing and keys corresponding to keys of a horizontally-oriented keyboard of a personal computer divided into a plurality of groups, each group of keys being shifted in a vertical direction of the housing with respect to one another, to allow a mobile device to accommodate a key layout similar to the key layout of the computer keyboard.

11 Claims, 8 Drawing Sheets

MOBILE DEVICE AND KEY ARRANGING METHOD

BACKGROUND OF THE INVENTION

1. Field of the Invention

The present invention generally relates to mobile devices. More particularly, the present invention relates to a mobile device having a portrait-oriented handheld housing, and keys which are arranged in such a manner that keys mounted on a landscape-oriented keyboard of a personal computer are divided into a plurality of groups, each group of keys being shifted in the longitudinal direction of the housing with respect to one another, and further relates to a key arranging method.

2. Description of the Related Art

Typically, personal computers incorporate a keyboard having substantially the same key layout as the traditional key layout of a typewriter, which is contrived to help operators efficiently enter characters with fingers of both hands. Therefore, operators can comfortably operate keyboards which are manufactured by different companies.

Meanwhile, mobile information devices or personal digital assistants (PDAs) such as electronic dictionaries are contrived in different manners so that keys may be mounted on an operating panel having a confined area to provide simplification and reliability for key operation.

Such mobile information devices which are contrived in different manners so that keys may be mounted thereon eventually provide different key layouts from manufacturer to manufacturer. Therefore, a problem arises in that a machine from one manufacturer may not be smoothly operated by users who use machines from different manufacturers, or by users who are not familiar with the same type of machine.

Figure 1:
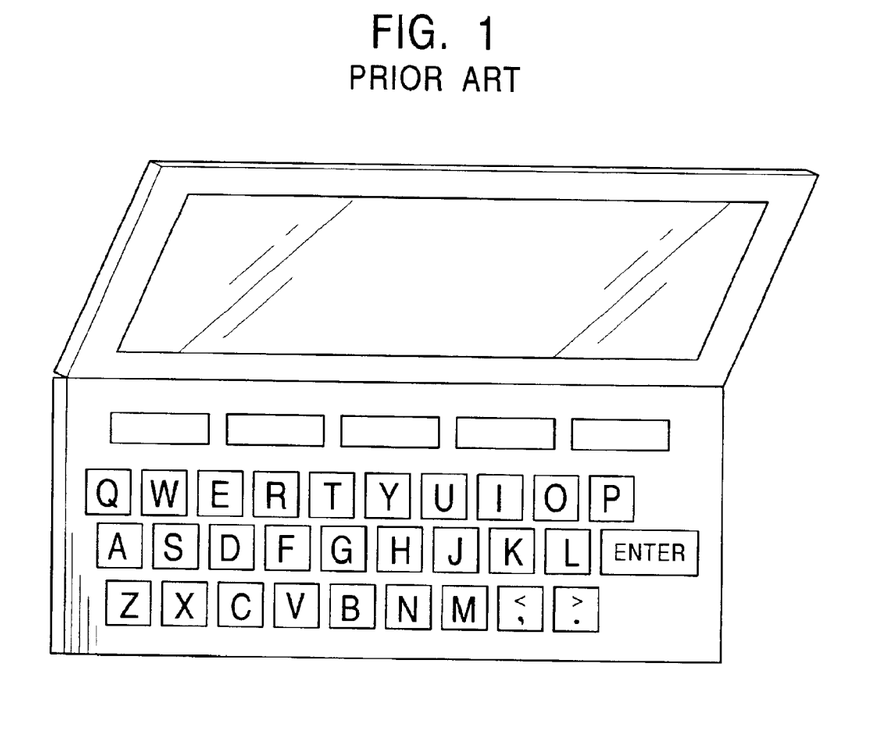
FIG. 1 is a view of a conventional mobile device incorporating a well-known key layout.

Another problem is that since a device incorporating the key layout of a typewriter is landscape-oriented as shown in FIG. 1, the housing is held by one hand while the keys are operated with fingers of the other hand with difficulty.

SUMMARY OF THE INVENTION

Accordingly, in view of the foregoing problems, the present invention is directed to a mobile device, such as an electronic dictionary and a mobile information device, which can be smoothly operated by users who are not familiar with the same type of device.

To this end, in one aspect of the present invention, a mobile device includes a portrait-oriented handheld housing, and keys mounted on the housing, the keys corresponding to keys mounted on a landscape-oriented keyboard of a personal computer, wherein each row of keys in the key layout of the keyboard is divided into at least two groups including a first group of keys and a second group of keys, the first group of keys being positioned along the width direction of the housing, the second group of keys being positioned along the width direction of the housing and arranged to be shifted in the longitudinal direction of the housing with respect to the first group of keys.

In another aspect of the present invention, a key arranging method for arranging keys on a portrait-oriented handheld housing, the keys corresponding to keys mounted on a landscape-oriented keyboard of a personal computer, includes the steps of: dividing each row of keys in the key layout of the keyboard into at least two groups; positioning one group along the width direction of the housing as a first group of keys; and positioning another group along the width direction of the housing as a second group of keys, and shifting the second group of keys in the longitudinal direction of the housing with respect to the first group of keys.

DESCRIPTION OF THE PREFERRED EMBODIMENT

Illustrative embodiments of the present invention are described with reference to the drawings as appropriate.

Figure 3:
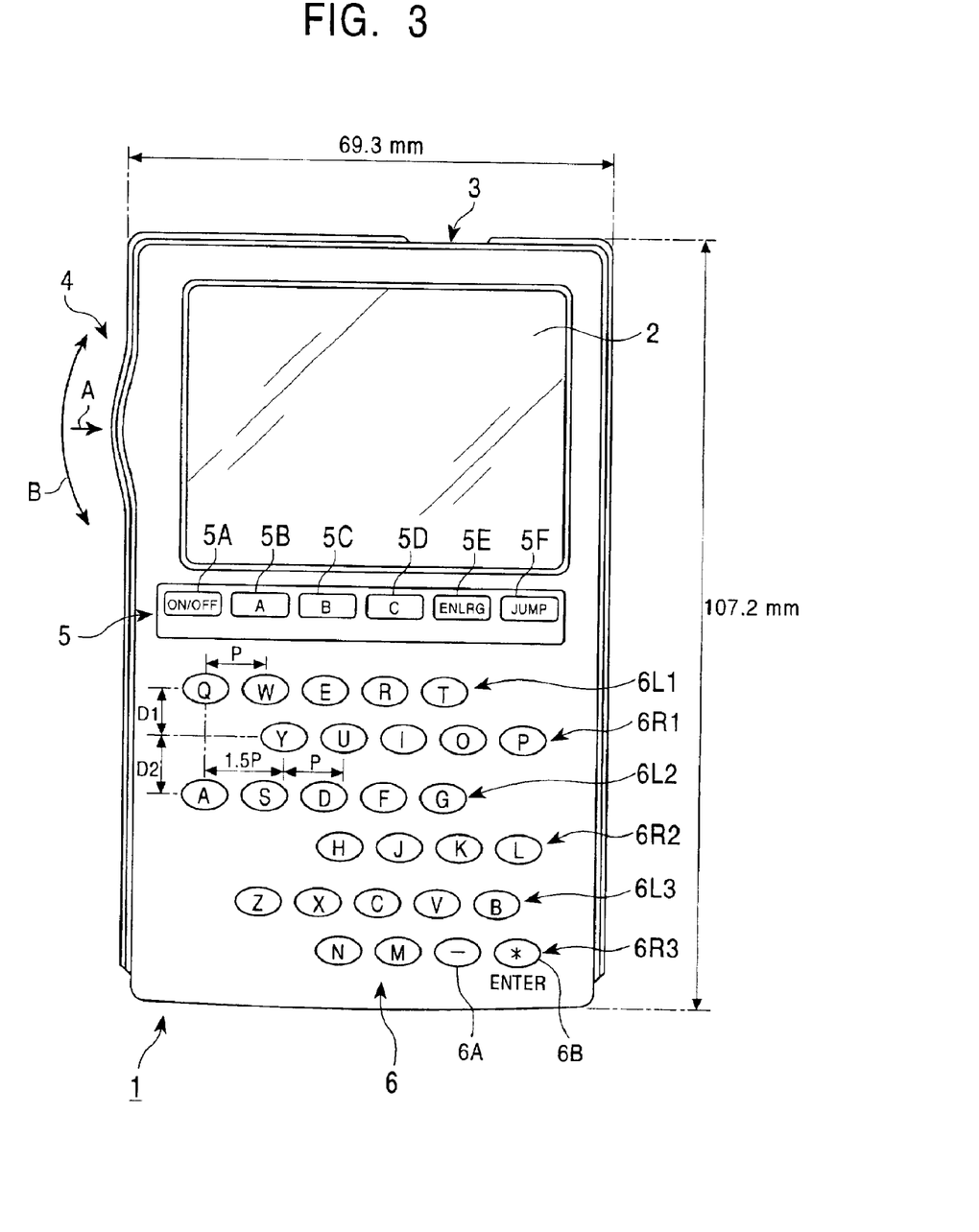
FIG. 3 is a plan view of an electronic dictionary according to one embodiment of the present invention.

FIG. 3 is a front view of an electronic dictionary 1 embodying a mobile device in accordance with an embodiment of the present invention. The electronic dictionary 1 has a rectangular configuration having a predetermined thickness which is dimensioned so as to be held with one hand, and have a portrait-oriented housing dimensioned to have, for example, a height of 107.2 mm and a width of 69.3 mm. The electronic dictionary 1 includes a display screen 2 formed of a liquid crystal display panel on the upper front surface so that a search result and the like may be displayed on the display screen 2. The electronic dictionary 1 further includes a pressing operator 3, which is positioned on the upper side of the housing relative to the display screen 2, for switching the current window appearing on the display screen 2 to the previous window. The electronic dictionary 1 further includes an operating dial 4 which is positioned on the left side of the housing relative to the display screen 2. The operating dial 4 is a depressible dial operator partially projecting from the side of the housing. The electronic dictionary 1 provides the capability of switching displayed windows on the display screen 2 by pressing the operating dial 4 as indicated by an arrow A, and provides the capability of scrolling through a window appearing on the display screen 2 by dialing the operating dial 4 as indicated by an arrow B.

Figure 4:
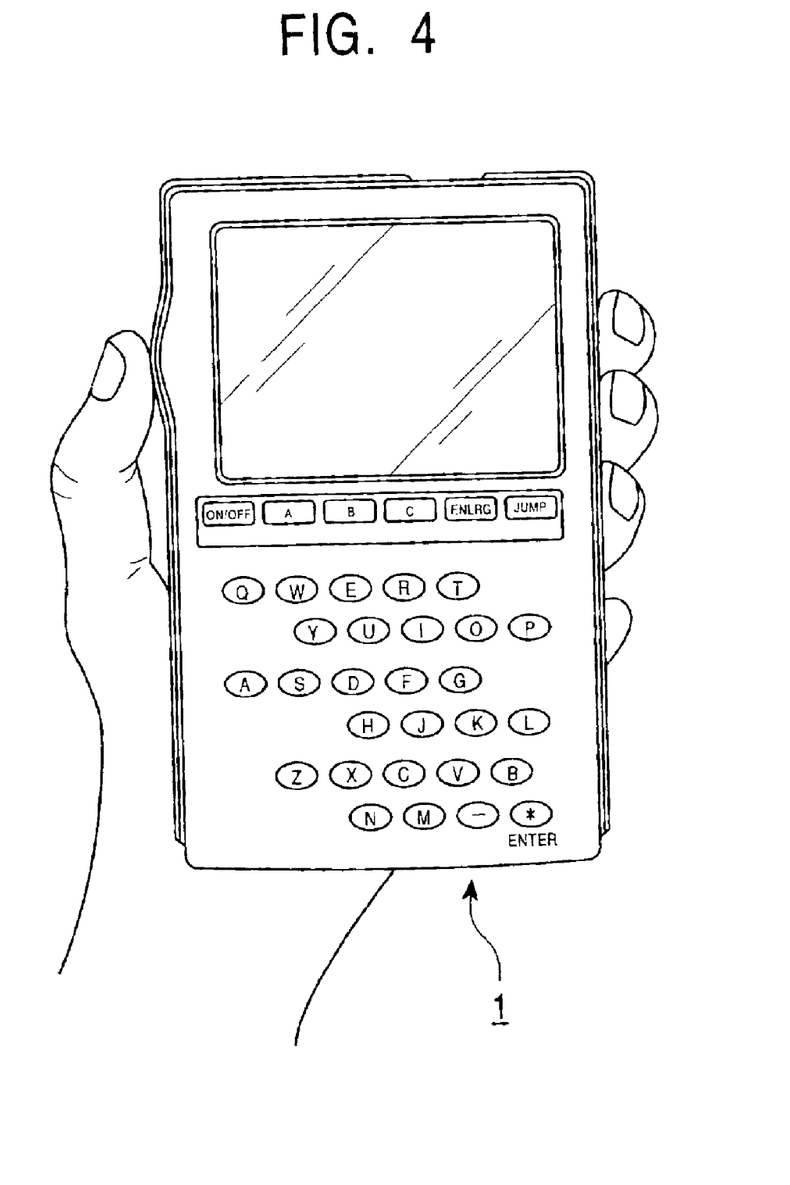
FIG. 4 is a view showing that the electronic dictionary according to the embodiment of the present invention is held by the left hand.

If the electronic dictionary 1 is implemented as a portrait-oriented mobile information device, the mobile information device may function as a so-called handheld device such that when the mobile information device is held by, for example, the left hand, the operating dial 4 can be operated by thumb of the left hand, as shown in FIG. 4, with the mobile information device being received by the palm.

The electronic dictionary 1 also includes various kinds of functional keys 5 along the bottom of the display screen 2, and character-entry keys 6 below the functional keys 5 for entering characters. Therefore, the electronic dictionary 1 incorporates the key layout which resembles the key layout of personal computer keyboard, in which the functional keys 5, followed by the character-entry keys 6, are arranged. The electronic dictionary 1 can be thus smoothly operated by users who are not familiar with this type of device.

The functional keys 5 include a power key 5A, a dictionary A key 5B, a dictionary B key 5C, a dictionary C key 5D, an enlargement key 5E, and a jump key 5F, in the order stated above from the left. The device is powered on or off by pressing the power key 5A. The dictionary A key 5B is pressed to search through a dictionary A, the dictionary B key 5C is pressed to search through a dictionary B, and the dictionary C key 5D is pressed to search through a dictionary C. The enlargement key 5E is operated to switch a window appearing on the display screen 2 to an enlarged version of the same window. The jump key 5F is operated to jump to a desired page on the display screen 2.

Figure 2:
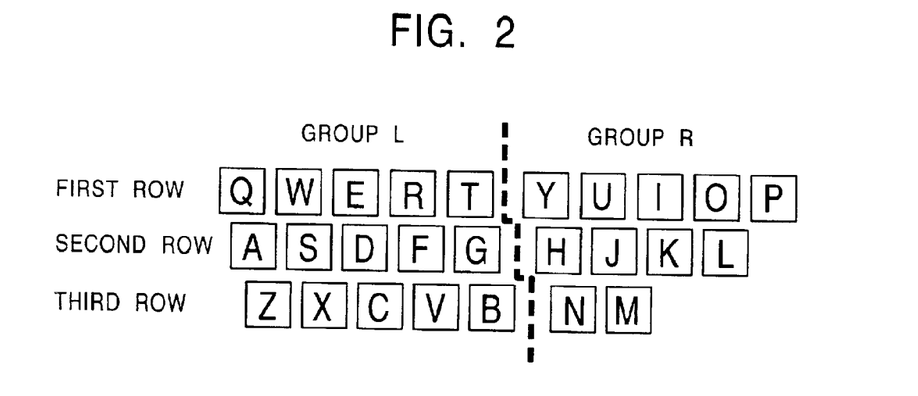
FIG. 2 is a view of an exemplary key layout on a keyboard.

The character-entry keys 6 are arranged in such a manner that two groups of character-entry keys for each row in the key layout of personal computer keyboard are alternately arranged, i.e., the first group of character-entry keys corresponding to the keys to be typically pressed with fingers of the left hand, and the second group of character-entry keys corresponding to the keys to be typically pressed with fingers of the right hand. A variety of key layouts have been proposed, but an alphabetical arrangement which complies with the ASCII (American Standard Code for Information Interchange) code or the JIS (Japan Industrial Standard) code, as shown in part in FIG. 2, is used herein by way of example. This is said to resemble the well-known key layout of a typewriter.

Specifically, with respect to the character-entry keys in the key layout of personal computer keyboard shown in FIG. 2, the character-entry keys 6 are arranged in the following manner. The first row of character-entry keys 6L1 in group L, namely, the letter "Q", "W", "E", "R", and "T" keys, are positioned in a first row of the character-entry keys 6. The first row of character-entry keys 6R1 in group R, namely, the letter "Y", "U", "I", "O", and "P" keys, are positioned in a second row of the character-entry keys 6. The second row of character-entry keys 6L2 in group L, namely, the letter "A", "S", "D", "F", and "G" keys, are positioned in a third row of the character-entry keys 6. The second row of character-entry keys 6R2 in group R, namely, the letter "H", "J", "K", and "L" keys, are positioned in a fourth row of the character-entry keys 6. The third row of character-entry keys 6L3 in group L, namely, the letter characters "Z", "X", "C", "V", and "B" keys, are positioned in a fifth row of the character-entry keys 6. The third row of character-entry keys 6R3 in group R, namely, the letter "N" and "M" keys, are positioned in a sixth row of the character-entry keys 6. In the sixth row, keys 6A and 6B respectively representing the hyphen (-) and asterisk (*) keys, which are frequently used, are also positioned in addition to the third row of character-entry keys 6R3 in group R.

In the electronic dictionary 1, therefore, each row of character-entry keys in the key layout of personal computer keyboard is sectioned into the group L of keys which is typically operated with fingers of the left hand, and the group R of keys which is typically operated with fingers of the right hand, the sections being alternately arranged from the top so that users who are not familiar with the operation of the same type of mobile information device would readily know the positions where the desired keys are located and therefore smoothly enter characters.

With the arrangement of the character-entry keys 6, the electronic dictionary 1 is designed so that the character-entry key rows 6R1, 6R2, and 6R3 in group L of which the keys are often operated with fingers of the right hand are displaced to the right relative to the character-entry key rows 6L1, 6L2, and 6L3 in group R of which the keys are often operated with fingers of the left hand. Therefore, a section consisting of the character-entry key rows 6L1, 6L2, and 6L3 corresponding to the keys in group L can be intuitively differentiated from a section consisting of the character-entry key rows 6R1, 6R2, and 6R3 corresponding to the keys the group R. This also contributes to a smooth character entry.

With the displacement of the keys, according to the present embodiment, adjacent keys along the width direction are spaced apart at a predetermined interval P. Based on the interval P, the character-entry key rows 6R1, 6R2, and 6R3 are displaced to the right relative to the character-entry key rows 6L1, 6L2, and 6L3 at a displacement interval 1.5P that is 1.5 times the interval P. Therefore, the character-entry key rows 6R1, 6R2, and 6R3, each key being positioned at a fixed interval, are respectively positioned at a fixed interval below the character-entry key rows 6R1, 6R2, and 6R3, each key being positioned at a fixed interval. For example, the "Q", "W", "E", "R", and "T" keys of the key row 6L1 are spaced apart from one another at an interval P, and the "Y", "U", "I", "O", and "P" keys of the key row 6R1 are also spaced apart from one another at the interval P. The "Y" key of the key row 6R1 is displaced widthwise to the right relative to the "Q" key of the key row 6L1 at a displacement interval 1.5P. Therefore, as shown in FIG. 3, the "Y" key of the key row 6R1 is positioned widthwise substantially in the middle between the "W" and "E" keys of the key row 6L1 and therebelow. Likewise, the "U" key is positioned substantially in the middle between the "E" and "R" keys and therebelow, the "I" key is positioned substantially in the middle between the "R" and "T" keys and therebelow, the "O" key is spaced apart from the "I" key at the interval P and is positioned to the right, and the "P" key is spaced apart from the "O" key at the interval P and is further positioned to the right. Accordingly, the electronic dictionary 1 accommodates a number of character-entry keys 6 in a small area to sufficiently improve the usability.

Furthermore, in the arrangement of the character-entry keys 6, the character-entry key rows 6L1 and 6R1, which are arranged in one row in the key layout of personal computer keyboard, corresponding to the keys which are typically operated with fingers of the left hand and the right hand, respectively, are close to each other. The character-entry key rows 6L2 and 6R2, and 6L3 and 6R3 are arranged in the same manner. This enables users to readily know the positions where the desired keys are located from the key layout of personal computer keyboard, resulting in a smooth character entry.

If a spacing D1 between the key rows 6L1 and 6R1 and a spacing D2 between the key rows 6R1 and 6L2 are designed in a relation satisfying D2>D1 as shown in FIG. 3, one row of keys shown in FIG. 2 will be more noticeable.

Furthermore, the character-entry keys 6 are colored such that the character-entry key rows 6L1, 6L2, and 6L3 corresponding to the keys operated with fingers of the left hand are colored by a first color, and the character-entry key rows 6R1, 6R2, and 6R3 corresponding to the keys operated with fingers of the right hand are colored by a second color different from the first color. Accordingly, the character-entry keys 6 which are colored in this manner allow the character-entry keys mainly operated with fingers of the left hand to be visually differentiated from the character-entry keys mainly operated with fingers of the right hand in the electronic dictionary 1. This also enables users to readily know the positions where the desired keys are located and to therefore smoothly enter characters.

Figure 5:
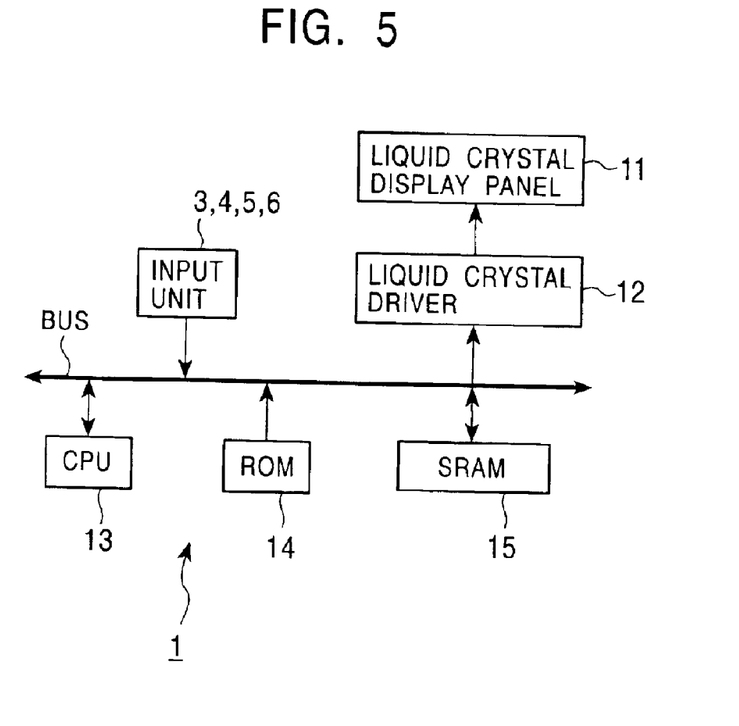
FIG. 5 is a block diagram of the electronic dictionary shown in FIG. 3.

FIG. 5 is a block diagram of the structure of the electronic dictionary 1. The electronic dictionary 1 includes a liquid crystal display panel 11, and a liquid crystal driver 12 for driving the liquid crystal display panel 11 under the control of a central processing unit (CPU) 13 which is executed via a bus BUS so that a variety of pictures may be displayed on the display screen 2. The electronic dictionary 1 further includes a read-only memory (ROM) 14, and a static RAM (SRAM) 15. The ROM 14 contains processing programs of the electronic dictionary 1, character data and text data to be searched for in the electronic dictionary 1, etc. The CPU 13 executes the processing programs stored in the ROM 14 in response to operations of the variety of keys or input units 3 to 6 while reserving a working area in the SRAM 15, so that the associated definitions of English words which have been entered can be displayed in response to the user's key operation.

During the processing, in response to the user's character-entry operation, the CPU 13 allows the objects to be searched for to be narrowed down in steps using a so-called forward matching retrieval to display the result, thereby achieving an improved usability. Furthermore, the objects to be searched for are listed, and the target is selected from the listed objects using the operation of the operating dial 4. Moreover, the objects to be searched for may be selected in steps while the definitions etc. are being presented. This also achieves an improved usability.

Figure 6:
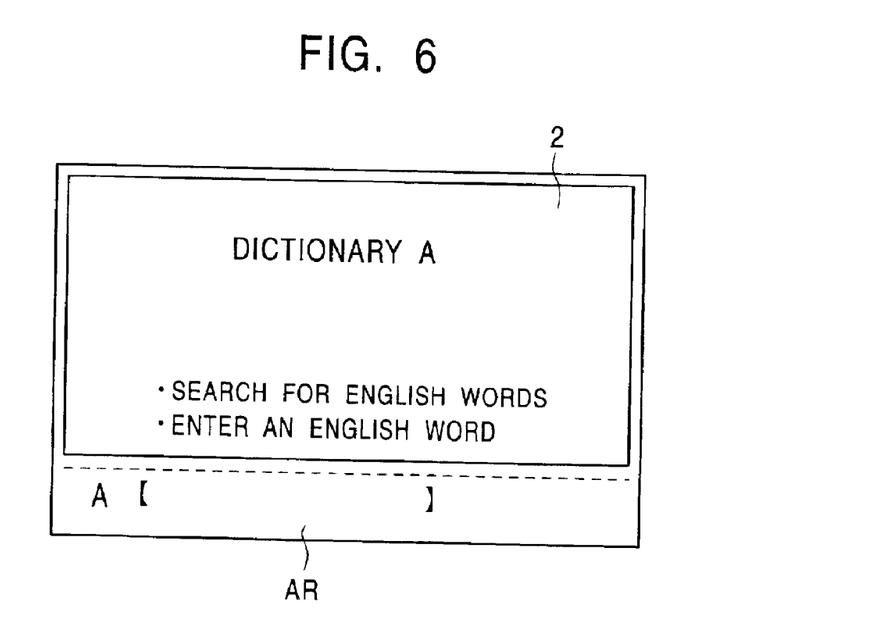
FIG. 6 is a plan view of an initial window of dictionary A contained in the electronic dictionary shown in FIG. 3.

FIG. 6 is a plan view of an initial window when the dictionary A key 5B is activated after the electronic dictionary 1 is powered on using the operation of the power key 5A. The CPU 13 allows the character "A", which indicates that the dictionary A is currently active, to appear at the bottom portion of the initial window. An indication area AR for the entered character stream is adjacent to the indication "A".

Figure 7:
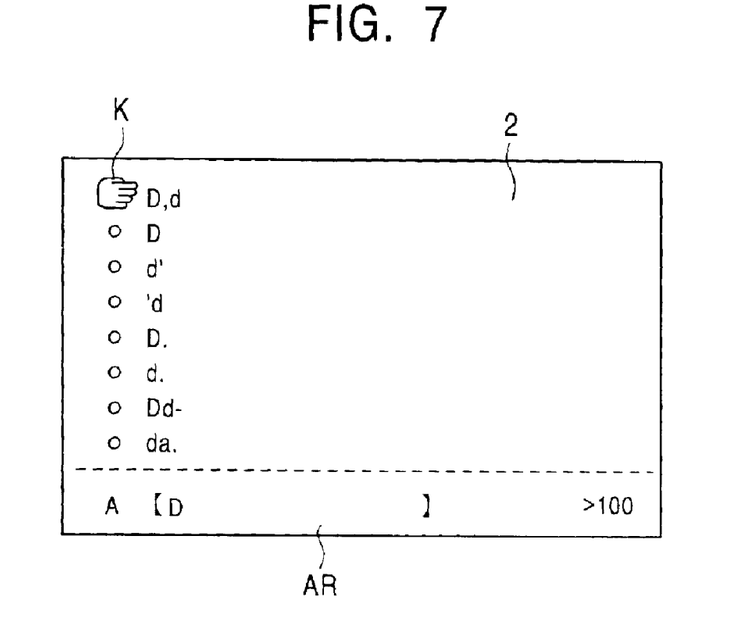
FIG. 7 is a plan view of a display window which follows the initial window shown in FIG. 6.

The display screen 2 presents a message "SEARCH FOR ENGLISH WORDS" in the center which indicates the functionality of the dictionary A, followed by another message "ENTER AN ENGLISH WORD" as an operational navigation for users. For example, if a user wants to search for an English word "DICTIONARY", and the user enters an initial letter "D", the CPU 13 searches through the records in the ROM 14 in response to the entry of the initial letter, and allows English words which start with "D" to be alphabetically presented, as shown in FIG. 7. The number of English words to be displayable is also presented at the bottom right corner of the window. In this example, ">100" is presented indicating that more than 100 English words are displayable.

A cursor K indicated by a symbol of "hand" is inserted at the top row such that the cursor K moves up and down in response to the dialing operation of the operating dial 4, and the display window is scrolled through to indicate further English words once the cursor K reaches the bottom of the window. While the cursor K moves up and down and the display window is scrolled through in this way, if the operating dial 4 is pressed with the cursor K pointing to the desired English word, the definitions of the English word pointed by the cursor K are provided.

Figure 8:
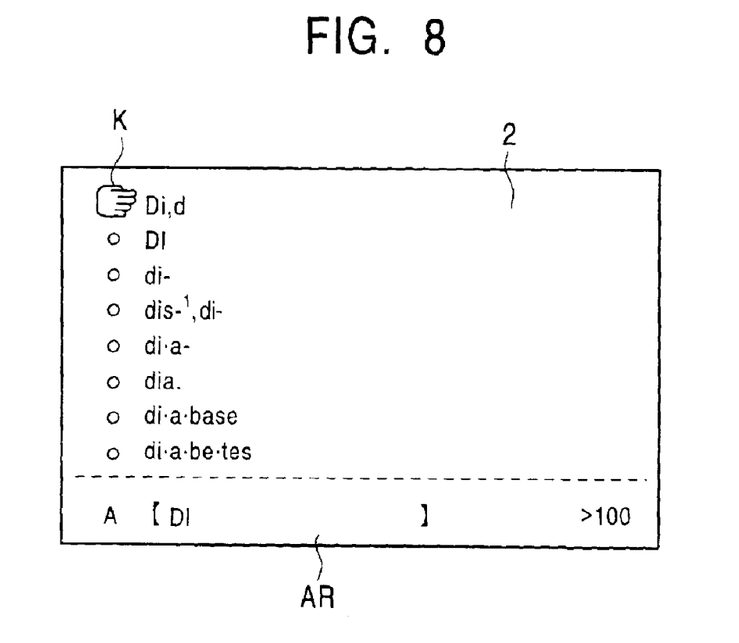
FIG. 8 is a plan view of a display window which follows the display window shown in FIG. 7.

When the next letter "I" is further entered, the CPU 13 allows English words which start with "DI" to be alphabetically presented, as shown in FIG. 8. The number of English words to be displayable is presented in the same manner as above. The cursor K is again inserted so that the operation through the cursor K may be accepted. Therefore, the electronic dictionary 1 is so designed that each time a letter is entered, the entered letter is subjected to the forward matching retrieval and the search result is displayed, so that the target can be easily found. In such presentation of the search result, an English word may be specified so that the definitions of the target word can be simply and quickly found.

The CPU 13 also accepts the input of wildcard, namely, the asterisk "*" key, in the forward matching retrieval using the English character entry, so that the desired word which is not correctly memorized would be simply and quickly searched for.

Figure 9:
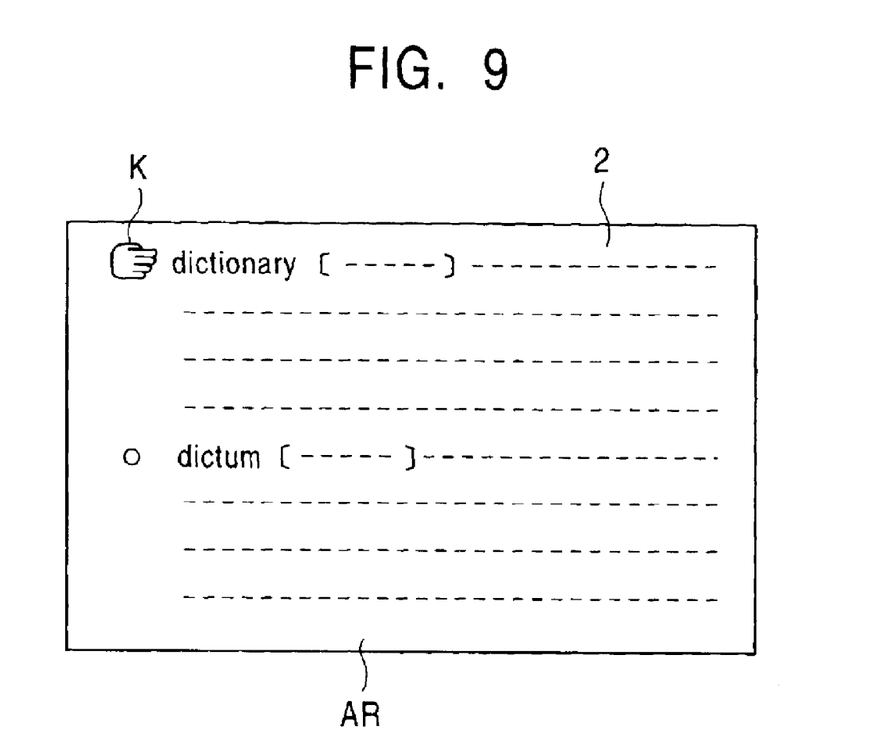
FIG. 9 is a plan view of a display window presenting a final search result.

FIG. 9 is a plan view of a display window on the display screen 2 upon the pressing operation of the operating dial 4 after the desired word is selected. During the processing on the dictionary A, when a user selects a word, the CPU 13 allows the selected word, followed by the text presenting the associated definitions, etc. to be displayed. Following the displayed text, a word subsequent to the selected word, and the text thereof are presented. The CPU 13 inserts the cursor K at the head of the word selected by the user, such that the cursor K moves up and down at the heads of the listed English words in response to the dialing operation of the operating dial 4, and the display window is scrolled through to indicate further English words and texts once the cursor K reaches the bottom of the window. Therefore, users can look through English words before and after the English word of interest by checking the definitions of these English words on the electronic dictionary 1.

Furthermore, if there is any related English word such as synonym in the displayed texts, the related English word is highlighted in the texts with predetermined marking at the head thereof. While it is highlighted with marking, as the cursor K moves in response to the operation of the operating dial 4, the cursor K is provided in place of the marking. If the operating dial 4 is pressed while the cursor K is provided in place of the marking, the displayed window is switched to a window of the related English word. Therefore, any related word or synonym can be readily found on the electronic dictionary 1.

Each time the pressing operator 3 is operated, the CPU 13 switches the displayed window to the previous window.

If characters are entered while the dictionary B or the dictionary C is selected, the CPU 13 uses the forward matching retrieval to display the target word as well as the corresponding spelling, definitions, etc. in the same manner.

Figure 10:
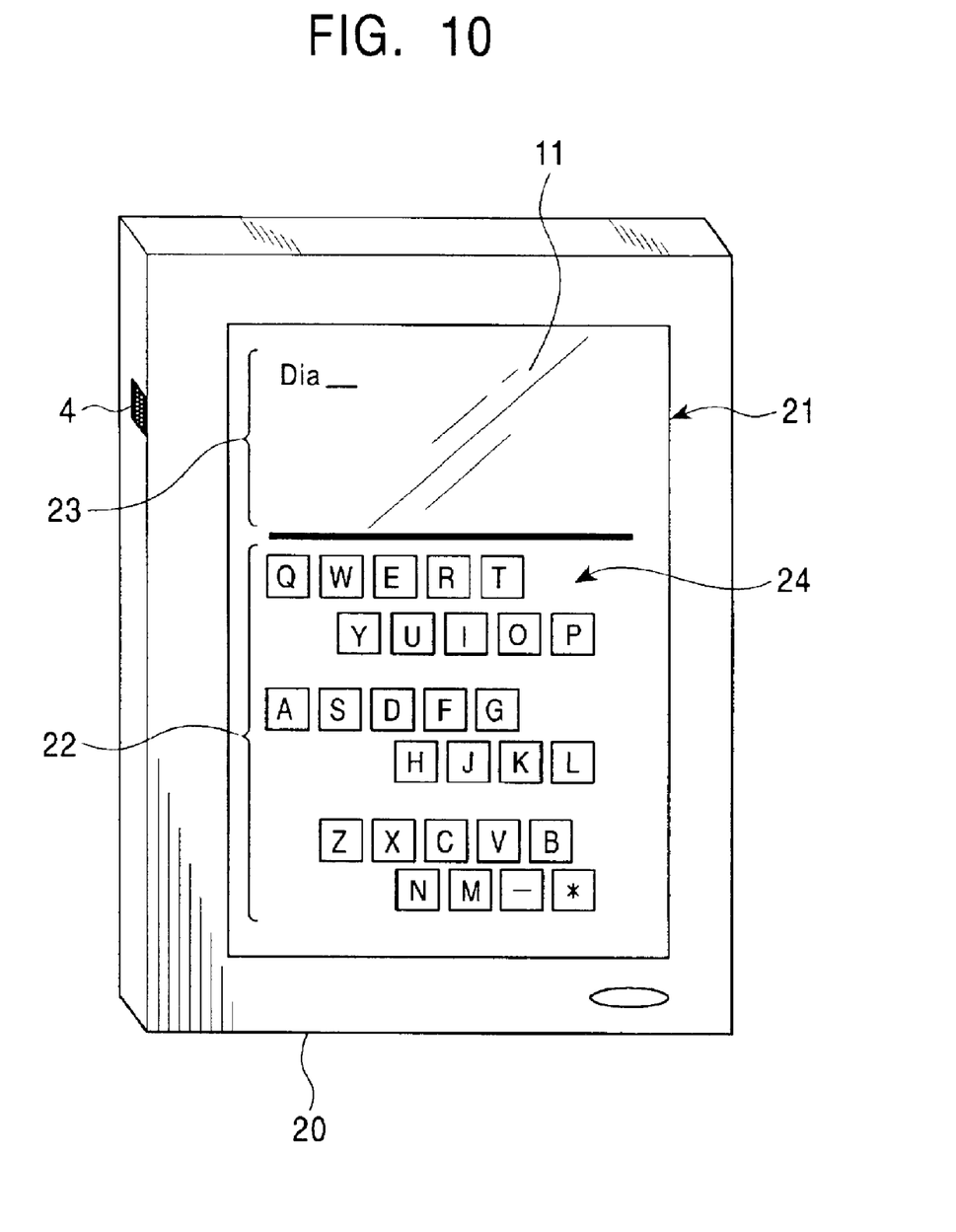
FIG. 10 is a view of a mobile information device according to another embodiment of the present invention.

A mobile information device 20 according to another embodiment of the present invention is described with reference to FIG. 10.

The mobile information device 20 has a housing which is so dimensioned as to have substantially the same size as that of the electronic dictionary 1, including an operating dial 4 on the side thereof in the same fashion as in the electronic dictionary 1. The mobile information device 20 has a liquid crystal display panel 11 formed on a surface thereof, over which a touch-sensitive panel 21 is formed through which user's input operation is performed according to items appearing on the liquid crystal display panel 11.

Figure 11:
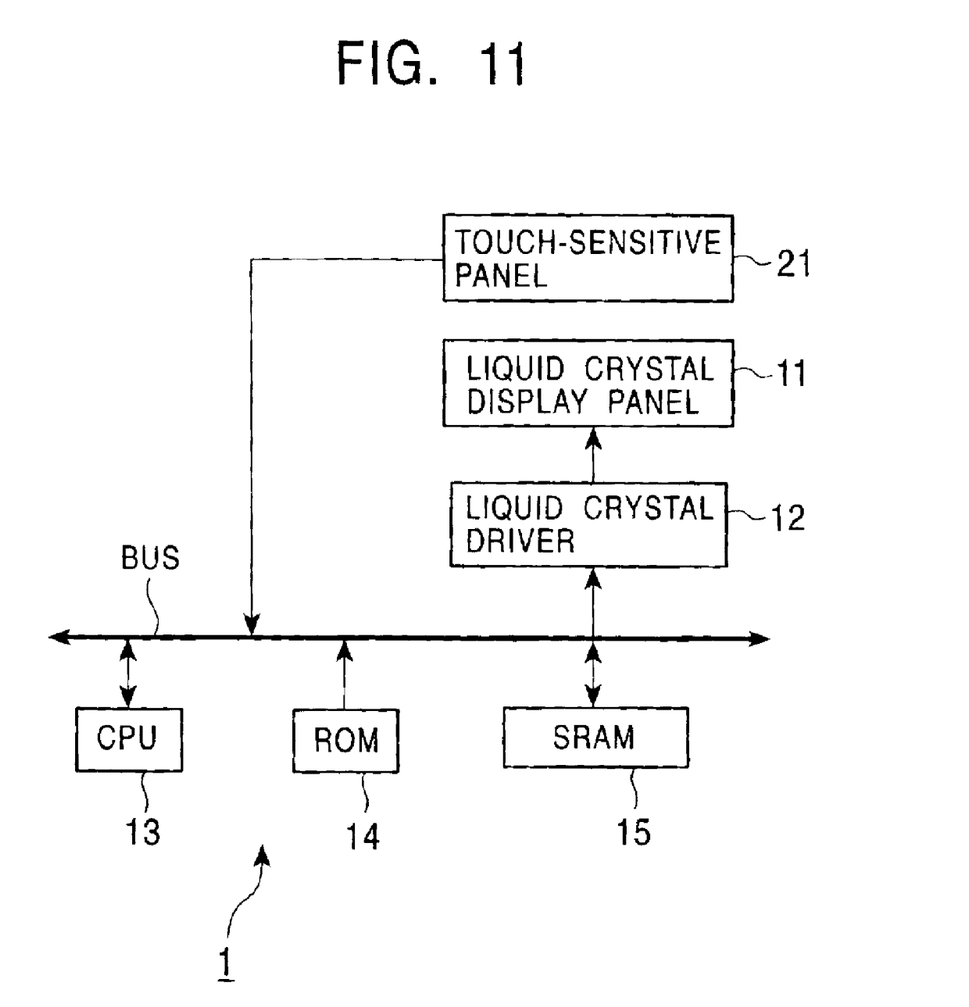
FIG. 11 is a block diagram of the mobile information device shown in FIG. 10.

FIG. 11 is a block diagram of the structure of the mobile information device 20. The same reference numerals are assigned to the same blocks as those shown in FIG. 5. The touch-sensitive panel 21 is formed on the upper surface of the liquid crystal display panel 11 so that the user's input operation may be performed through the touch-sensitive panel 21 by the CPU 13.

For the sake of convenience, the liquid crystal display panel 11 may be divided into a character entry section 22 and a character display section 23, and the character-entry section 22 includes key-like items 24 arranged in the same layout as that of the character-entry keys 6 on the electronic dictionary 11.

Once a user taps the items 24 with fingers or a pen tip in the character-entry section 22 on the liquid crystal display panel 11 at the positions corresponding to characters which the user wants to enter, the CPU 13 enables the characters operated by the user to be detected through the touch-sensitive panel 21. The CPU 13 allows the detected characters to appear in the character display section 23 on the liquid crystal display panel 11 so that the user can visually recognize whether or not the presented characters are the desired characters.

The mobile information device 20 having such a structure also has a width dimensioned so that the device 20 can be held by one hand of a user since each row of keys in the key layout of computer keyboard shown in FIG. 2 is also divided into a plurality of sections which are then mounted thereon. For example, when the device 20 shown in FIG. 10 is held by the left hand, the operating dial 4 can also be operated by thumb of the left hand, as in the electronic dictionary 1 shown in FIG. 4.

In this case, the CPU 13 controls the liquid crystal driver 12 so that the items 24 representing predetermined keys in the key layout of computer keyboard can be provided on the liquid crystal display panel 11. The items 24 representing the predetermined keys in the key layout of computer keyboard are provided so as to correspond to a predetermined number of keys, as shown in FIG. 10.

The CPU 13 further allows the regions on the touch-sensitive panel 21 corresponding to key items 24 which are provided on the liquid crystal display panel 11 to be associated with the key items appearing thereon. Specifically, when a user touches a region which is sensitive to the character "Q" on the liquid crystal display panel 11, the CPU 13 recognizes that the character "Q" key was entered.

Accordingly, users who are not familiar with the same type of device can readily know which keys are located at which positions from the key layout of personal computer keyboard, and smoothly operate the device.

Furthermore, according to the present invention, the character-entry keys corresponding to the keys mainly operated with fingers of the right hand are displaced to the right relative to the character-entry keys corresponding to the keys mainly operated with fingers of the left hand. Therefore, users can more readily know the positions where the desired keys are located based on the key layout of personal computer keyboard, and smoothly enter characters.

Furthermore, a row of the character-entry keys corresponding to the keys positioned to the right is positioned between rows of the character-entry keys corresponding to the keys positioned to the left. Therefore, if a large number of character-entry keys are arranged in a small area, degradation in usability is avoided.

Furthermore, the colored keys allow the character-entry keys positioned to the right to be differentiated from the character-entry keys positioned to the left. Therefore, users can more readily know the positions where the desired keys are located based on the key layout of personal computer keyboard, and can smoothly enter characters.

While colors are used to differentiate the keys positioned to the right from the keys positioned to the left in the illustrated embodiments, the present invention is not limited thereto, and the character-entry keys corresponding to one row of keys in the key layout of personal computer keyboard may be colored by the same color while another row of keys in the key layout of the keyboard may be colored by a different color. Otherwise, coloring may be removed, if any.

In the illustrated embodiments, the rows of character-entry keys in group R (see FIG. 2) and the rows of character-entry keys in group L (see FIG. 2) are alternately positioned, and the rows of character-entry keys in group R are displaced to the right relative to the rows of character-entry keys in group L. However, the present invention is not limited thereto, and the rows of character-entry keys in group R may be displaced merely to the right. Alternatively, the rows of character-entry keys in group R may not be displaced to the right as long as sufficient usability is ensured in practice.

In the illustrated embodiments, the character-entry keys corresponding to one row of keys in the key layout of personal computer keyboard are positioned at a narrower spacing, but the present invention is not limited thereto. The character-entry keys may be positioned at an even spacing in the longitudinal direction, as appropriate.

While the character-entry keys have only the function to enter alphabetic letters in the illustrated embodiments, the present invention is not limited thereto, and may incorporate keys having an ability to enter the letters of any other language.

In the illustrated embodiments, the character-entry keys are arranged according to the ASCII code represented by the key layout of a typewriter, but the present invention is not limited thereto. The present invention may be broadly applied to key layouts which comply with a variety of standards.

While the present invention is implemented in so-called PDAs including electronic dictionaries and mobile information devices in the illustrated embodiments, the present invention is not limited thereto, and may be widely applied to a variety of mobile units.

According to the present invention, therefore, a mobile device is arranged so that rows of a plurality of character-entry keys in the horizontal direction are repeated in the longitudinal direction, each row consisting of keys mainly operated with fingers of the left hand and keys mainly operated with fingers of the right hand in the key layout of personal computer keyboard, in order to provide each of the character-entry keys for the function to enter a corresponding character. This enables the mobile device to be smoothly operated by users who are not familiar with the same type of device.

What is claimed is:

1. A mobile device comprising:
   a handheld housing that is taller than it is wide when the mobile device is in an upright position; and
   a plurality of device keys mounted on the housing, the plurality of device keys corresponding to a QWERTY keyboard of a personal computer having the plurality of device keys arranged in three rows, wherein each of the three rows of device keys is divided into a leading portion and a following portion;

each of the three rows of device keys corresponds to a single horizontal row of keys on the QWERTY keyboard of the personal computer, wherein the leading portion includes all five device keys in their original sequence corresponding to a left portion of the single horizontal row of keys on the QWERTY keyboard, and the following portion includes device keys in their original sequence corresponding to a right portion of the single horizontal row of keys on the QWERTY keyboard;

the following portion of the first row is arranged below the leading portion of the first row and is misaligned therewith in a horizontal direction, so that a first key of the following portion is not directly below a first key of the leading portion of the first row;

the following portion of the second row is arranged below the leading portion of the second row and misaligned in the horizontal direction, so that a first key of the following portion is not directly below a first key of the leading portion of the second row; and the following portion of the third row is arranged below the leading portion of the third row and is misaligned in the horizontal direction, so that a first key of the following portion is not directly below a first key of the leading portion of the third row.

2. The mobile device according to claim 1, wherein the device keys are colored such that a color of the leading portions of the three rows of device keys is different from a color of the following portions of the three rows of device keys.

3. The mobile device according to claim 1, wherein the device keys are colored such that a color of the leading portion and a following portion of the first row are the same, a color of the leading portion and a following portion of the second row are the same and different from the color of the first row, and a color of the leading portion and the following portion of the third row are the same and are the same as the color of the first row.

4. The mobile device according to claim 1, further comprising touch-sensitive liquid crystal display panel input means mounted on the housing, and wherein the plurality of device keys on the housing are formed by the touch-sensitive liquid crystal display panel input means.

5. A key arranging method for arranging device keys on a handheld housing of a mobile device in which the handheld housing is taller than it is wide when the device is in an upright position, the device keys corresponding to three rows of keys of a QWERTY keyboard of a personal computer, the key arranging method comprising the steps of:

assigning each row of three rows of the device keys into a leading portion and a following, portion, each of the three rows of device keys corresponding to a single horizontal row of keys on the QWERTY keyboard of the personal computer, wherein the leading portion includes all five device keys in their original sequence corresponding to a left portion of the single horizontal row of keys on the QWERTY keyboard, and the following portion includes device keys in their original sequence corresponding to a right portion of the single horizontal row of keys on the QWERTY keyboard;

arranging the following portion of the first row below the leading portion of the first row so as to be misaligned therewith in a horizontal direction, so that a first key of the following portion is not directly below a first key of the leading portion of the first row;

arranging the following portion of the second row below the leading portion of the second row so as to be misaligned therewith in the horizontal direction, so that a first key of the following portion is not directly below a first key of the leading portion of the second row; and arranging the following portion of the third row below the leading portion of the third row so as to be misaligned therewith in the horizontal direction, so that a first key of the following portion is not directly below a first key of the leading portion of the third row.

6. The key arranging method according to claim 5, further comprising the step of making a color of the leading portions of the three rows of device keys different from a color of the following portions of the three rows of device keys.

7. The key arranging method according to claim 5, further comprising the step of making a color of the device keys such that a color of the leading portion and the following portion of the first row are the same, a color of the leading portion and the following portion of the second row are the same and are different from the color of the first row, and a color of the leading portion and following portion of the third row are the same and are the same as the color of the first row.

8. The key arranging method according to any one of claims 5–7, further comprising the steps of:

providing a touch-sensitive liquid crystal display panel input means on the housing;

forming device key images at predetermined positions on the liquid crystal display panel input means; and associating the device key images formed at the predetermined positions on the liquid crystal display panel input means with a plurality of device keys on the housing, wherein the plurality of device keys on the housing are arranged on the liquid crystal display panel input means on the housing.

9. The key arranging method according to claim 5, wherein the step of arranging the device keys on said device further comprises:

separating adjacent ones of the device keys of the leading portion and following portion of the first row of device keys in the longitudinal direction of the housing by a first spacing; and separating the first key of the leading portion from the first key of the following portion of the first row in them longitudinal direction by a second spacing different than said first spacing so as to enhance the misaligning.

10. The key arranging method according to claim 9, wherein the second spacing is greater than the first spacing.

11. The mobile device according to claim 1, wherein adjacent ones of the device keys of the leading portion and the following portion of the first row of device keys are separated in the longitudinal direction of the housing by a first spacing; and the first key of the leading portion of the first row is separated in the longitudinal direction of the housing from the first key of the following portion by a second distance different than the first distance.

* * * * *